United States Patent
Guzman et al.

(10) Patent No.: US 10,513,183 B2
(45) Date of Patent: Dec. 24, 2019

(54) TILT AND TURN DIAL

(71) Applicants: DENSO International America, Inc., Southfield, MI (US); DENSO CORPORATION, Kariya, Aichi-pref. (JP)

(72) Inventors: Christopher Guzman, Saint Clair Shores, MI (US); Christopher Levay, Grand Rapids, MI (US); Javon Tucker, Southfield, MI (US); Jesse Moellers, Novi, MI (US); Murali Daruri, Troy, MI (US); Homare Shirai, Kariya (JP); Yuki Matsumoto, West Bloomfield, MI (US)

(73) Assignees: DENSO International America, Inc., Southfield, MI (US); DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/836,430

(22) Filed: Dec. 8, 2017

(65) Prior Publication Data

US 2018/0170185 A1 Jun. 21, 2018

Related U.S. Application Data

(60) Provisional application No. 62/435,300, filed on Dec. 16, 2016.

(51) Int. Cl.
*B60K 35/00* (2006.01)
*B60K 37/06* (2006.01)

(52) U.S. Cl.
CPC .............. *B60K 37/06* (2013.01); *B60K 35/00* (2013.01); *B60K 2370/126* (2019.05); *B60K 2370/135* (2019.05); *B60K 2370/146* (2019.05)

(58) Field of Classification Search
CPC ...................................................... G05G 9/047
See application file for complete search history.

(56) References Cited

U.S. PATENT DOCUMENTS

| 2,958,233 | A | * | 11/1960 | Johnson | .................. F16K 11/18 137/636.2 |
|---|---|---|---|---|---|
| 4,530,376 | A | * | 7/1985 | Chatterjea | ........... F15B 13/0422 137/596 |
| 5,621,196 | A | | 4/1997 | Nishijima et al. | |

(Continued)

FOREIGN PATENT DOCUMENTS

| JP | 2000164072 A | 6/2000 |
|---|---|---|
| JP | 2000305649 A | 11/2000 |

(Continued)

*Primary Examiner* — Robin J Mishler
(74) *Attorney, Agent, or Firm* — Harness, Dickey & Pierce, P.L.C.

(57) ABSTRACT

A control dial for inputting commands to a human-machine interface (HMI). The control dial includes a base dial mounted to a base configured to support the base dial at a neutral position, a first tilted position tilted in a first direction from the neutral position, and a second tilted position tilted in a second direction from the neutral position. The second direction is opposite to the first direction. An outer dial is rotatably mounted to the base dial such that the outer dial is rotatable to enter commands to the HMI at each one of the neutral position, the first tilted position, and the second tilted position.

18 Claims, 7 Drawing Sheets

(56) References Cited

U.S. PATENT DOCUMENTS

| | | |
|---|---|---|
| 5,767,839 A | 6/1998 | Rosenberg |
| 2003/0085793 A1 | 5/2003 | Inoue et al. |
| 2003/0107551 A1 | 6/2003 | Dunker |
| 2004/0154910 A1 | 8/2004 | Hayashi |
| 2005/0077157 A1 | 4/2005 | Sasanouchi et al. |
| 2005/0190153 A1 | 9/2005 | Ushimaru et al. |
| 2005/0259088 A1 | 11/2005 | Ogasawara et al. |
| 2005/0284737 A1* | 12/2005 | Shitanaka ............. H01H 25/04 200/5 R |
| 2008/0129431 A1 | 6/2008 | Onodera et al. |
| 2008/0174572 A1 | 7/2008 | Katsuta et al. |
| 2008/0249668 A1 | 10/2008 | Miyata et al. |
| 2008/0251371 A1 | 10/2008 | Sugahara et al. |
| 2009/0076676 A1 | 3/2009 | Yamamoto et al. |
| 2009/0079595 A1 | 3/2009 | Naka et al. |
| 2009/0273490 A1 | 11/2009 | Ishikawa et al. |
| 2010/0270133 A1 | 10/2010 | Baker |
| 2012/0056761 A1 | 3/2012 | Sano |
| 2012/0260761 A1 | 10/2012 | Yamazaki et al. |
| 2012/0286977 A1 | 11/2012 | Yamazaki et al. |
| 2012/0286978 A1 | 11/2012 | Yamazaki et al. |
| 2012/0287033 A1 | 11/2012 | Yamazaki et al. |
| 2014/0043303 A1 | 2/2014 | Baker et al. |
| 2016/0167512 A1 | 6/2016 | Joo et al. |

FOREIGN PATENT DOCUMENTS

| | | |
|---|---|---|
| JP | 2002170464 A | 6/2002 |
| JP | 2003176870 A | 6/2003 |
| JP | 2004094786 A | 3/2004 |
| JP | 2005209442 A | 8/2005 |
| JP | 2006278084 A | 10/2006 |
| JP | 2007059159 A | 3/2007 |
| JP | 2009009798 A | 1/2009 |
| JP | 2011043887 A | 3/2011 |

* cited by examiner

TILT AND TURN DIAL

CROSS-REFERENCE TO RELATED APPLICATION

This application claims the benefit of U.S. Provisional Application No. 62/435,300, which was filed on Dec. 16, 2016. The entire disclosure of U.S. Provisional Application No. 62/435,300 is incorporated herein by reference.

FIELD

The present disclosure relates to a tilt and turn dial for a human machine interface (HMI).

BACKGROUND

This section provides background information related to the present disclosure, which is not necessarily prior art.

A conventional human machine interface (HMI) system for a vehicle is typically located within a passenger cabin at a center console thereof. Recent trends call for HMI systems to present a variety of functions and outputs, and thus HMI systems need to accept a variety of inputs from passengers. To accept a large number of inputs, current HMI systems typically have a plurality of input devices, such as a plurality of input switches and dials. Many current HMI systems are thus complex and difficult to operate, particularly while the vehicle is in operation. The present disclosure advantageously includes improved HMI input devices in the form of tilt and turn dials, each one of which can be manipulated by a user to enter a variety of different input commands, which advantageously reduces the number of dials and switches needed to operate various systems, such as an HVAC system, entertainment system, autonomous driving system, etc. The tilt and turn dials of the present disclosure are also advantageously easy to use while operating a vehicle.

SUMMARY

This section provides a general summary of the disclosure, and is not a comprehensive disclosure of its full scope or all of its features.

The present disclosure provides for a control dial for inputting commands to a human-machine interface (HMI). The control dial includes a base dial mounted to a base configured to support the base dial at a neutral position, a first tilted position tilted in a first direction from the neutral position, and a second tilted position tilted in a second direction from the neutral position. The second direction is opposite to the first direction. An outer dial is rotatably mounted to the base dial such that the outer dial is rotatable to enter commands to the HMI at each one of the neutral position, the first tilted position, and the second tilted position.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of select embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
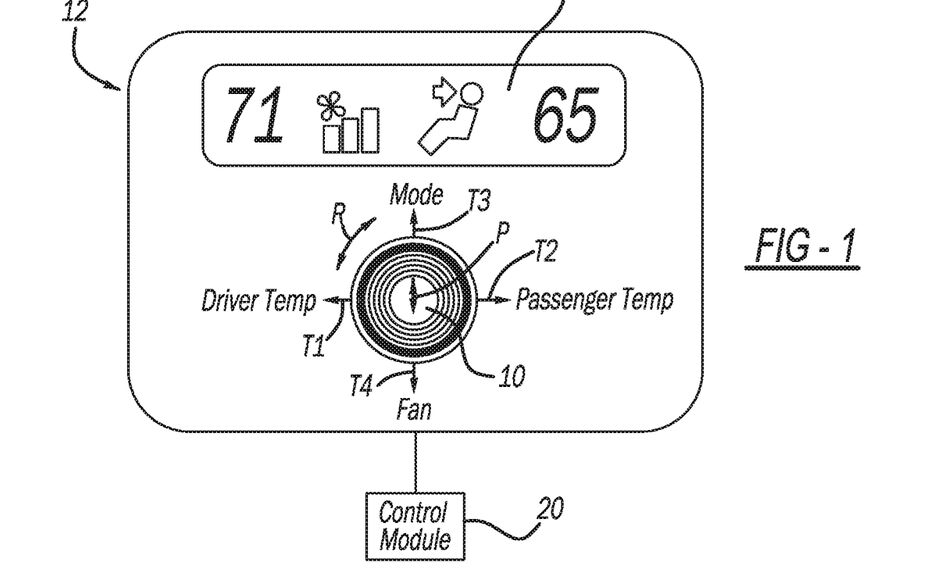
FIG. 1 illustrates a tilt and turn dial assembly in accordance with the present disclosure associated with an exemplary human machine interface (HMI)

FIG. 1 illustrates a tilt and turn dial assembly in accordance with the present disclosure at reference numeral 10. The dial assembly 10 can be associated with any suitable human machine interface (HMI) 12, and a user can control the dial assembly 10 to input any suitable commands to the HMI 12. In the example of FIG. 1, an HMI 12 for a vehicle heating, ventilation, and air conditioning (HVAC) system is illustrated. The dial assembly 10 can be used with any other suitable vehicular or non-vehicular HMI as well.

The dial assembly 10 is configured to be manipulated by a user to input HVAC operating commands to any control module 20 suitable for operating the HVAC system, or any other system that the HMI 12 is associated with. In this application, the term "control module" may be replaced with the term "circuit." The term "control module" may refer to, be part of, or include processor hardware (shared, dedicated, or group) that executes code and memory hardware (shared, dedicated, or group) that stores code executed by the processor hardware. The code is configured to provide the features of the modules, controllers, and systems described herein. The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

In the example illustrated, the dial assembly 10 can be used by a user to input a desired driver's side temperature, passenger's side temperature, fan speed, and HVAC mode, for example. The dial assembly 10 can advantageously be tilted and turned (and in the configuration of FIGS. 2-4 pressed) by a user to input various commands to the control module 20 regarding desired operation of the HVAC system, or any other suitable system controlled by any suitable HMI. For example, the dial assembly 10 can be: tilted by the user in direction T1 (to the left) to control driver's side temperature; tilted by the user in direction T2 (to the right) to control passenger's side temperature; tilted by the user in direction T3 (upward or forward) to control the HVAC mode; or tilted by the user in direction T4 (downward or backwards) to control fan speed. The dial assembly 10 can be configured to be tilted any suitable degree from the neutral position, such as 30° in each tilt direction T1, T2, T3, and T4. Although four tilt directions T1, T2, T3, T4 are illustrated, the dial assembly 10 can include any suitable number of tilt directions greater than, or less than, four. For example, the dial assemblies 10A and 10B described herein are configured to only tilt in directions T1 and T2. Dial assembly 10C described herein is configured to tilt in four tilt directions T1, T2, T3, and T4.

Figure 8:
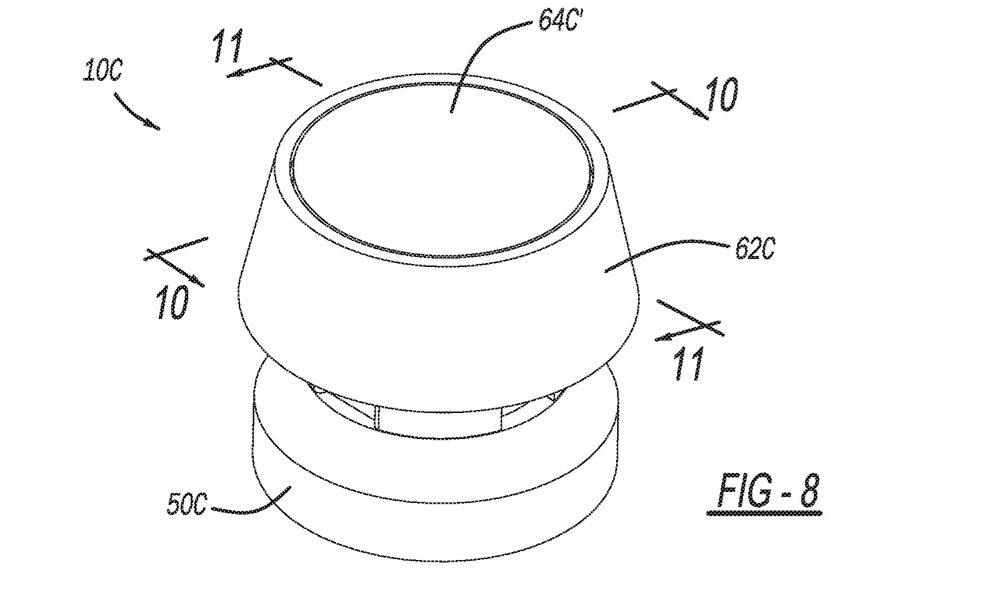
FIG. 8 is a perspective view of another tilt and turn dial assembly in accordance with the present disclosure.

Once the user tilts the dial assembly 10 in any one of the tilt directions T1, T2, T3, and T4, the dial assembly 10 automatically locks at the tilted position, and thus will not automatically return to the neutral position illustrated in FIG. 1. When the dial assembly 10 is in the neutral position or any one of the tilted positions, an outer dial of the dial assembly 10 can be rotated by the user to input additional commands to the HMI 12. Specifically, outer dial 62A (FIG. 2, for example), 62B (FIG. 5, for example), 62C (FIG. 8, for example), can be rotated by the user to input a command associated with the selected tilt position T1, T2, T3, T4. For example, when the dial assembly 10 is tilted in direction T1 to control driver's side temperature, rotation of the outer dial 62A, 62B, 62C will change the desired temperature setting for the driver's side. When the dial assembly 10 is tilted in direction T2 to control passenger's side temperature, rotation of the outer dial 62A, 62B, 62C will change the desired temperature setting for the passenger's side. Rotation of the outer dial 62A, 62B, 62C when the dial assembly 10 is in the neutral position (such as illustrated in FIG. 1 in which the dial assembly 10 has not been tilted to any one of the tilt positions T1, T2, T3, or T4) can control the desired temperature of both the driver's side and the passenger's side simultaneously.

Figure 2:
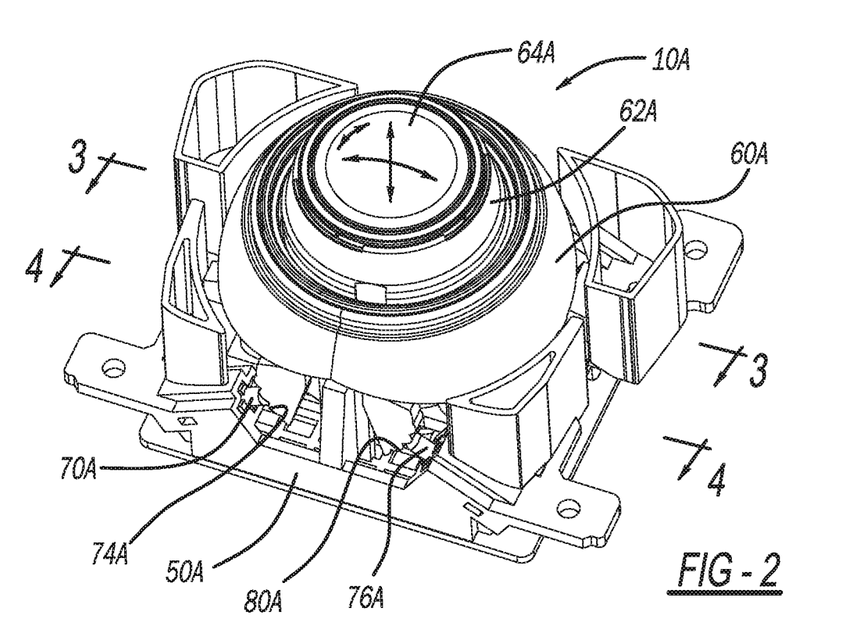
FIG. 2 is a perspective view of an exemplary tilt and turn dial assembly in accordance with the present disclosure.

The dial assembly 10 can also be configured to accept user commands input by depressing a push button 64A (FIG. 2). Specifically, the push button 64A may be depressed in direction P regardless of the tilt position of the dial assembly 10 to input commands to the HMI 12, and specifically to the control module 20. Pressing the push button 64A can input any suitable command, such as, but not limited to, the following: turn fan on/off; turn auto temperature on/off; mute/unmute volume; and turn radio on/off.

The tilt and turn dial assembly 10 thus advantageously has expanded functionality as compared with current dial assemblies, which permits a plurality of commands to be input using the single dial assembly 10, thus eliminating the need for additional dials and switches. By replacing a plurality of dials and switches with the dial assembly 10 of the present disclosure, the number of HMI controls can be decreased, which simplifies operation and makes room for other features.

Figure 3:
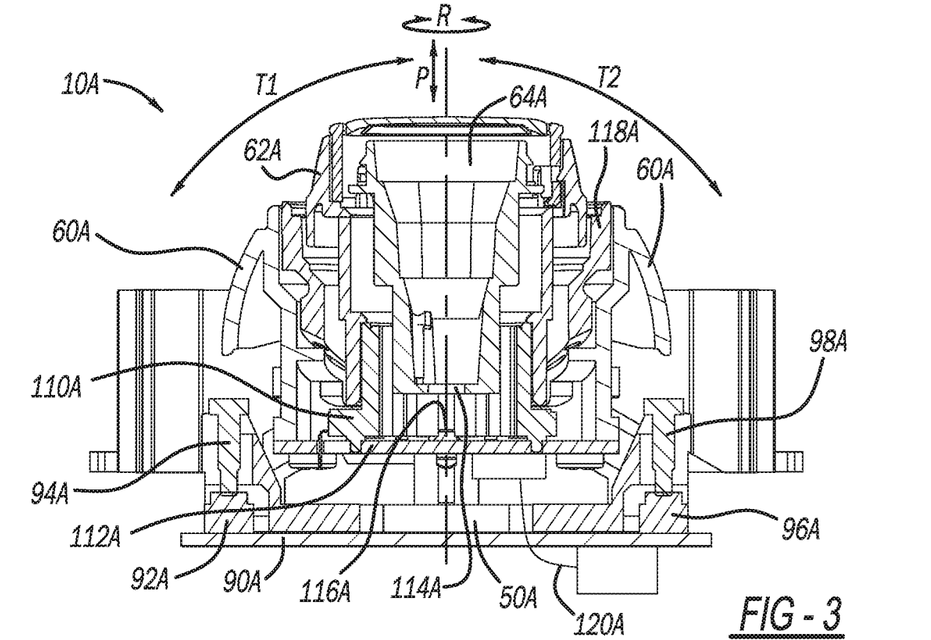
FIG. 3 is a cross-sectional view taken along line 3-3 of FIG. 2.
Figure 4:
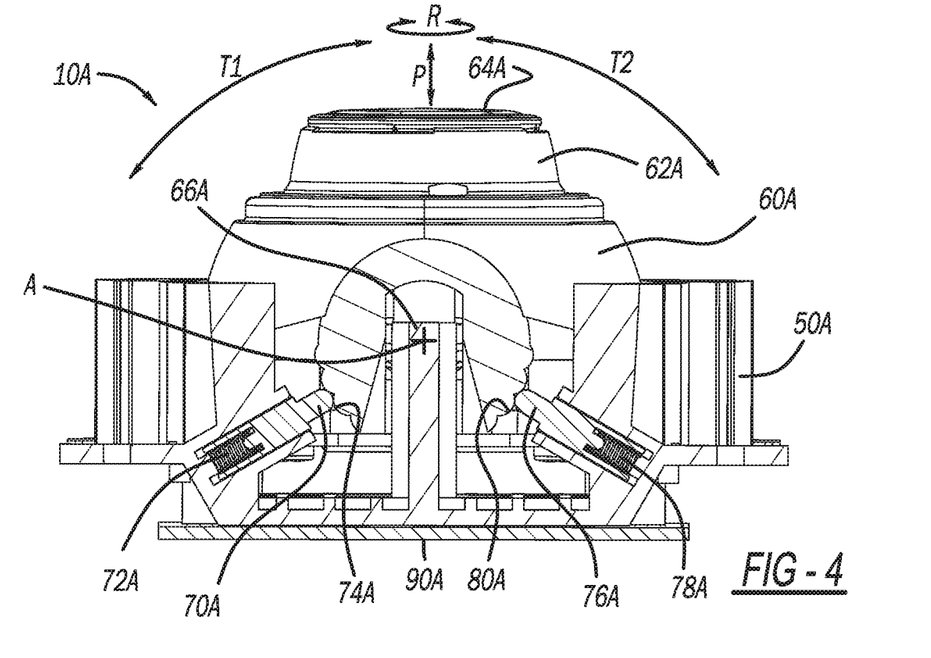
FIG. 4 is a cross-sectional view taken along line 4-4 of FIG. 2.

With reference to FIGS. 2-4, dial assembly 10A of the present disclosure will now be described in additional detail. The dial assembly 10 of FIG. 1 may be configured as the dial assembly 10A. The dial assembly 10A includes a case or base 50A, which can be mounted in any suitable manner at the HMI 12, or any other HMI for controlling any suitable vehicular or non-vehicular system. The dial assembly 10A generally includes a base dial 60A, an outer dial 62A, and a push button 64A. The base dial 60A is supported by a support post 66A (FIG. 4), and can be tilted by a user about axis A in tilt directions T1 and T2.

Mounted at the base 50A is a first plunger 70A and a second plunger 76A. The first plunger 70A is biased in an outward position by a first spring 72A (FIG. 4), and the second plunger 76A is biased in an outward position by a second spring 78A (FIG. 4). The first plunger 70A is biased outward so as to contact ridges 74A (FIGS. 2 and 4) of the base dial 60A. The plunger 76A is biased outward so as to contact the ridges 80A of the base dial 60A (FIGS. 2 and 4). As illustrated in FIGS. 2 and 4, cooperation between the plunger 70A and the ridges 74A, as well as cooperation between the plunger 76A and the ridges 80A, maintains the base dial 60A (along with the outer dial 62A and the push button 64A) in a neutral position. When a user tilts the base dial 60A in tilt direction T1 or T2, the plungers 70A and 76A follow along (and "click" along) the ridges 74A and 80A respectively in order to retain (or "lock") the base dial 60A in either one of the tilt directions T1 or T2. The base dial 60A can be locked in any other suitable manner as well. The base dial 60A is rotated about a support post 66A at a rotation axis A thereof.

The dial assembly 10A further includes a primary printed circuit board (PCB) 90A. Mounted to the primary PCB 90A is a first switch 92A and a second switch 96A (FIG. 3). The switches 92A and 96A can be any suitable switches, such as tact switches or two-way switches, or optical sensors, or any other suitable device for detecting the position of the base dial 60A. The first and second switches 92A and 96A are depressed by the base dial 60A when the base dial 60A is tilted in order to identify the tilt direction. Specifically, and with reference to FIG. 3, when a user tilts the base dial 60A in tilt direction T1, the base dial 60A contacts push pin 94A, which actuates the first switch 92A. The first switch 92A then transmits a signal to the control module 20 informing the control module 20 of the tilt position of the base dial 60A. When a user tilts the base dial 60A in tilt direction T2, the base dial 60A contacts push pin 98A, which actuates the second switch 96A. The second switch 96A sends a signal to the control module 20 indicating that the user tilted the base dial 60A in tilt direction T2. If the dial assembly 10A is configured to also tilt in tilt directions T3 and T4 (as dial assembly 10C is), additional switches will be mounted to the primary PCB 90A and positioned to be actuated by the base dial 60A when the user tilts the base dial 60A in directions T3 and T4. Tilt of the base dial 60A by a user can be detected in any other suitable manner as well, such as with any suitable sensor and/or accelerometer.

The dial assembly 10A further includes a rotary encoder 110A (FIG. 3), which may include a shaft encoder or potentiometer. The rotary encoder 110A is in cooperation with both the outer dial 62A and a secondary or satellite PCB 112A. Thus rotation of the outer dial 62A rotates the rotary encoder 110A, which is in cooperation with the secondary PCB 112A. The secondary PCB 112A generates a signal corresponding to the amount of rotation of the rotary encoder 110A, which corresponds to the distance that a user has rotated the outer dial 62A. This signal is sent to the control module 20 either directly or indirectly by way of the primary PCB 90A. The secondary PCB 112A can be connected to the primary PCB 90A in any suitable manner, such as by any suitable connector 120A, in order to relay the signal from the secondary PCB 112A to the primary PCB 90A. In this manner, the distance that a user rotates the outer dial 62A in direction R (either clockwise or counterclockwise) is measured and input to the control module 20. Rotation of the outer dial 62A can be measured using any other suitable device as well.

The secondary PCB 112A further includes a push button switch 114A, which is in alignment with the push button 64A. When a user presses the push button 64A, the push button 64A directly, or indirectly, actuates the push button switch 114A. The push button switch 114A generates a signal to the control module 20 informing the control module 20 that a user has pressed the push button 64A. The signal from the push button switch 114A can be sent directly to the control module 20, or indirectly by way of the secondary PCB 112A and the connector 120A. In this manner, the control module 20 detects when a user depresses the push button 64A for inputting a command to the HMI 12.

The dial assembly 10A further includes one or more illuminating elements 116A, such as light emitting diodes (LEDs). The illuminating elements 116A can be arranged at any suitable position to illuminate any suitable features of the dial assembly 10A. For example, the illuminating elements 116A may be mounted to the secondary PCB 112A, and arranged to illuminate a glow ring 118A surrounding the outer dial 62A, or illuminate push button 64A graphic or indicator prism.

Figure 5:
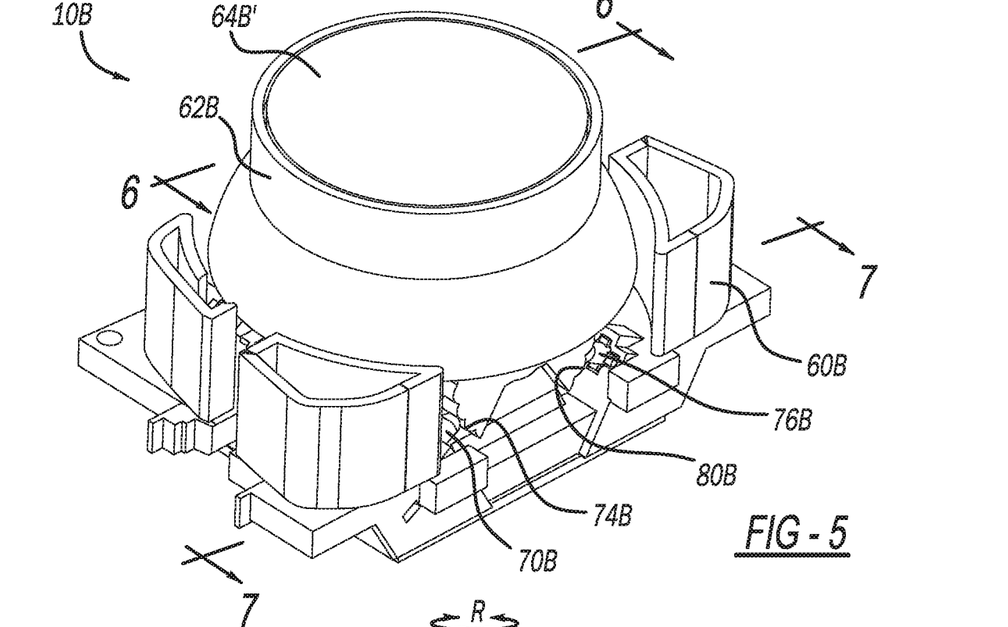
FIG. 5 is a perspective view of an additional tilt and turn dial assembly in accordance with the present disclosure.
Figure 6:
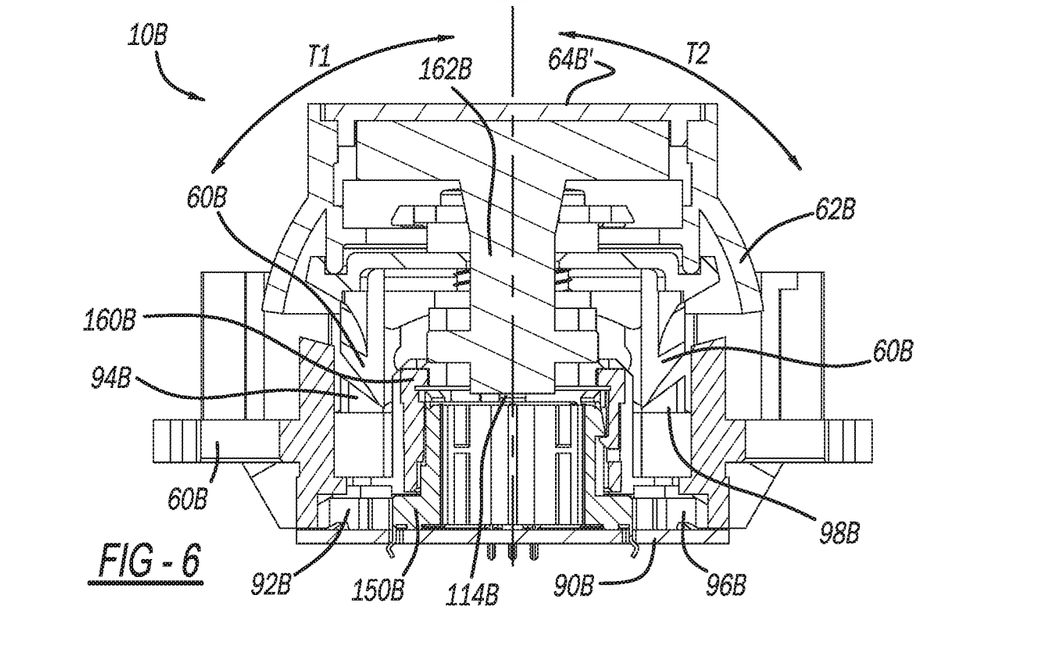
FIG. 6 is a cross-sectional view taken along line 6-6 of FIG. 5.
Figure 7:
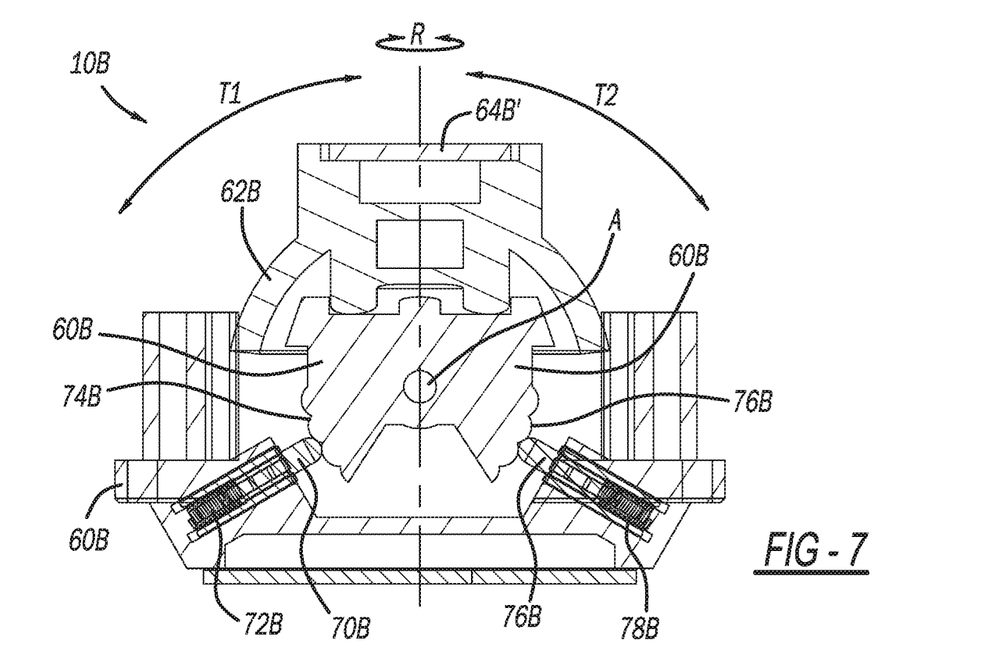
FIG. 7 is a cross-sectional view taken along line 7-7 of FIG. 5.

With reference to FIGS. 5-7, an additional dial assembly in accordance with the present disclosure is illustrated at reference numeral 10B. The dial assembly 10B is similar to the dial assembly 10A, and thus the similar features are designated in the drawings with the same reference numbers, but with the suffix "B" instead of "A." The description of the dial assembly 10A is also sufficient to describe the dial assembly 10B with respect to these similar elements. Unlike the dial assembly A, the dial assembly B does not include a push button 64A. Instead, the dial assembly 10B includes a cover 64B', which covers the outer dial 62B. The cover 64B' is not depressible. Thus, the dial assembly 10B does not include the push button switch 114A of the dial assembly 10A. Furthermore, the dial assembly 10B does not include the secondary satellite PCB 112A of the dial assembly 10A, which advantageously simplifies assembly and reduces costs.

The dial assembly 10B includes a rotary encoder 150B, which is in cooperation with the primary PCB 90B. Coupled to the rotary encoder 150B is an adapter 160B, which is coupled to a post 162B. Rotation of the outer dial 62B by a user results in rotation of the post 162B, which rotates the adapter 160B and the rotary encoder 150B. The rotary encoder 150B is in cooperation with the primary PCB 90B such that rotation of the rotary encoder 150B generates a signal to the control module 20 indicating how far the user has rotated the outer dial 62B.

With reference to FIGS. 8-11, an additional dial assembly in accordance with the present disclosure is illustrated at reference numeral 10C. The dial assembly 10C is similar to the dial assembly 10A, and thus the similar features are designated in the drawings with the same reference numbers, but with the suffix "C" instead of "A." The description of the dial assembly 10A is also sufficient to describe the dial assembly 10C with respect to these similar elements. The dial assembly 10C is configured to be tilted by a user in each one of tilt directions T1, T2, T3, and T4. The dial assembly 10C is not configured to be pressed by a user in direction P, and thus cover 64C' cannot be depressed.

Figure 9:
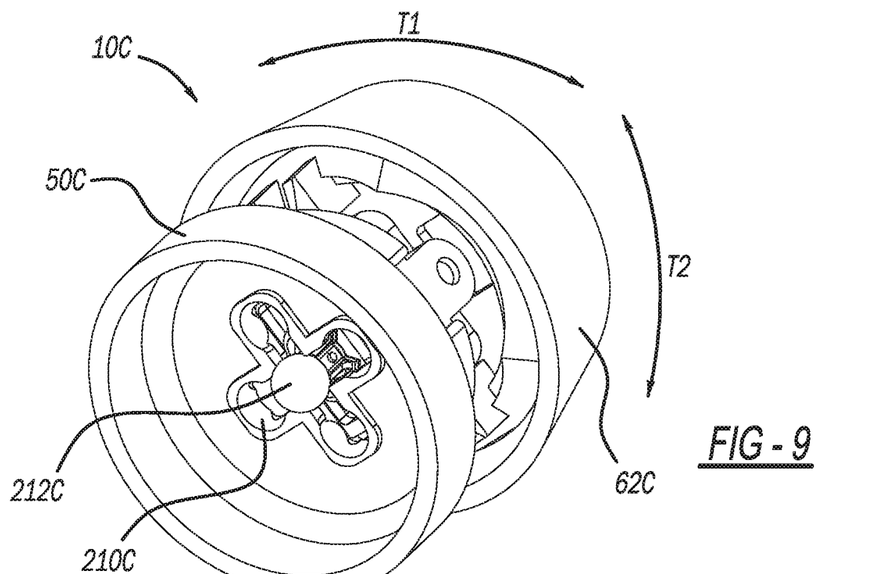
FIG. 9 is another perspective view of the dial assembly of FIG. 8.
Figure 10:
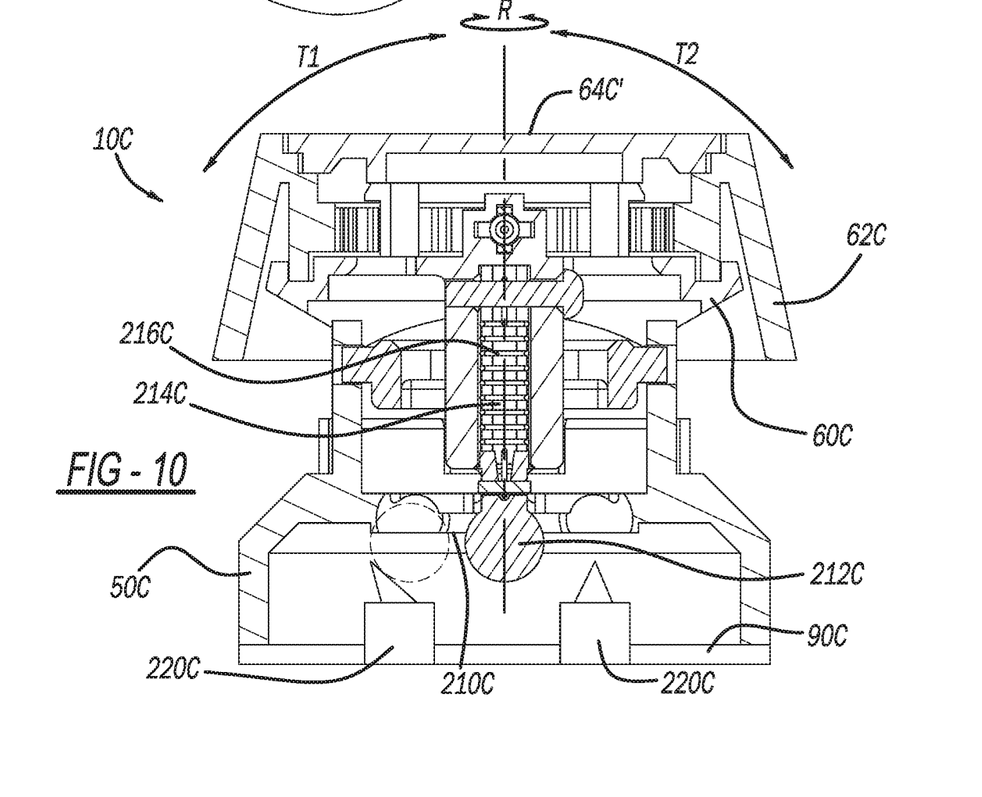
FIG. 10 is a cross-sectional view taken along line 10-10 of FIG. 8.
Figure 11:
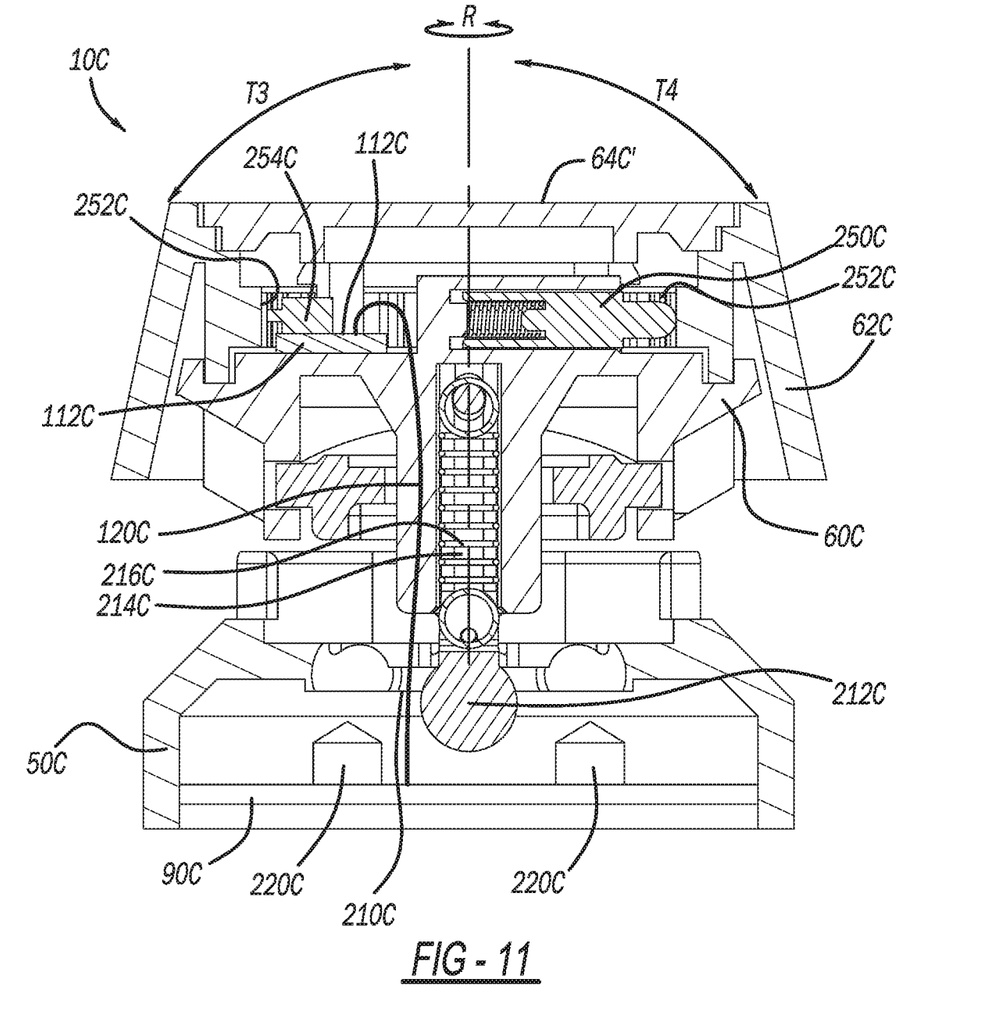
FIG. 11 is a cross-sectional view taken along line 11-11 of FIG. 8.

With particular reference to FIGS. 9-11, the base 50C defines a receptacle 210C, which is in receipt of a ball 212C of a ball joint. The ball 212C is connected to a post 214C (FIGS. 10 and 11). A spring 216C flexibly mounts the post 214C and the ball 212C, thereby allowing the ball 212C to move inward and outward as a user tilts the dial assembly 10C in directions T1, T2, T3, or T4, which allows the ball 212C to move through the receptacle 210C and locks the ball 212C at the desired tilt position. The dial assembly 10C (as well as the dial assemblies 10A and 10B) can include an electromagnet arranged in any manner suitable to stabilize the dial at any one of the tilt positions T1, T2, T3, or T4. The dial assembly 10C can include any suitable switch, sensor, accelerometer, or other device operable to identify the tilt position T1, T2, T3, or T4 of the base dial 60C. For example, switches 220C mounted to main PCB 90C can be used to detect tilt direction. Tilt direction feedback can be provided in any suitable manner, such as in the form of "click" feedback. The "click" feedback can be generated in any suitable manner, such as interaction between receptacle 210C and ball 212C.

The dial assembly further includes a spring-biased plunger 250C, which extends generally perpendicular to a rotational axis of the outer dial 62C into engagement with ridges 252C defined at an interior of the outer dial 62C. Thus when a user rotates the outer dial 62C, the plunger 250C follows the ridges 252C to provide feedback to the user in the form of "clicks" or any other suitable feedback.

The dial assembly 10C further includes any suitable rotational detection device, such as a two-way switch 254C or a photo encoder, for example. The two-way switch 254C is mounted to secondary circuit board 112C and extends generally perpendicular to a rotational axis of the outer dial 62C into engagement with ridges 252C defined at an interior of the outer dial 62C. Thus when a user rotates the outer dial 62C, the two-way switch 254C follows the ridges 252C. The two-way switch 254C generates signals as the ridges 252C pass across it. The switch 254C may interact with any other area as well, such as dial cap 64C'. A signal indicating the rotational position of the outer dial 62C is sent to the control module 20 by way of the circuit boards 112C and 90C, and connector 120C extending therebetween.

Figure 12:
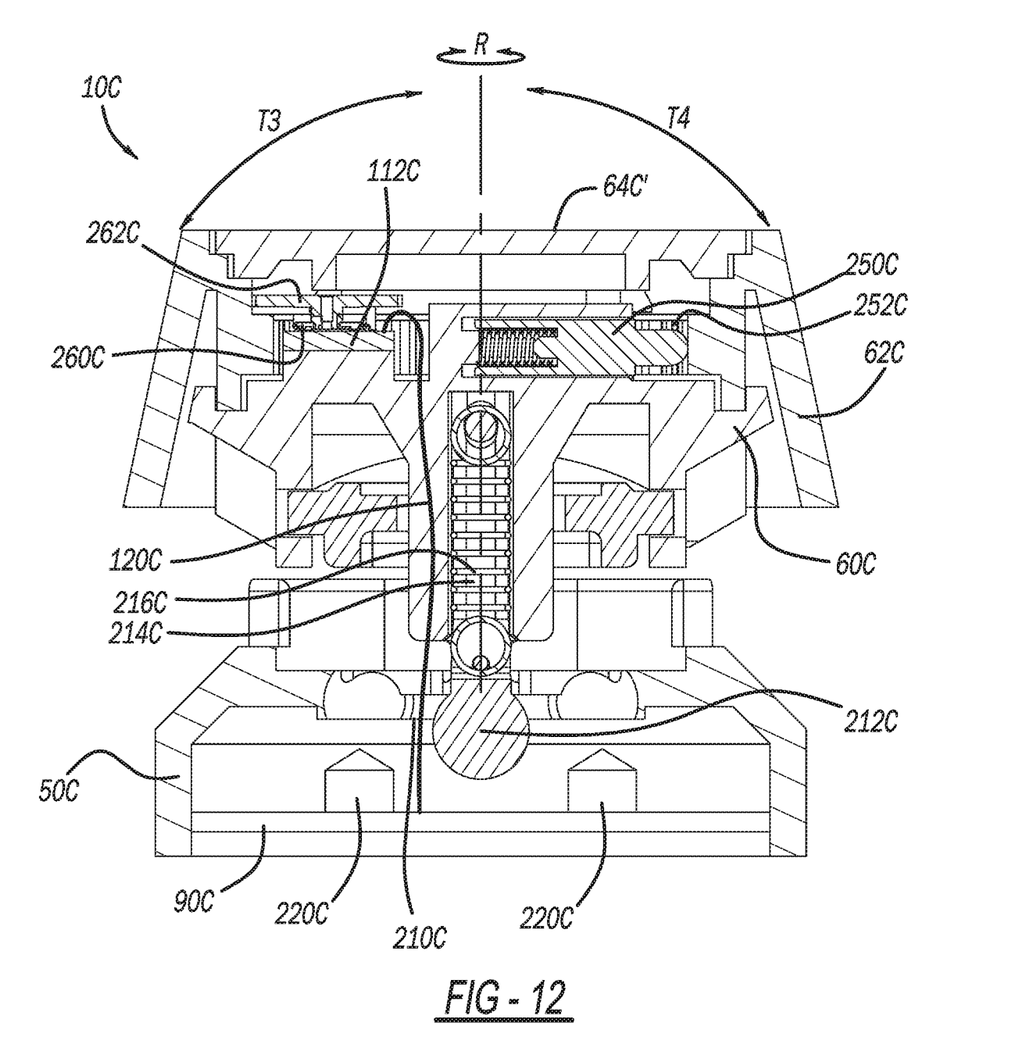
FIG. 12 is a cross-sectional view of the dial assembly of FIG. 8 according to another embodiment of the present disclosure.

FIG. 12 illustrates another exemplary rotational detection device for the outer dial 62C in the form of an encoder 260C and gear structure 262C. The encoder 260C can be mounted to the secondary circuit board 112C and interacts with at least one gear of the gear structure 262C, which interacts with the dial body 62C. Rotation of the dial body 62C will cause rotation of the gear, which in turn rotates the encoder 260C. The encoder 260C will send a signal regarding the rotational position of the dial body 62C to the control module 20 by way of the circuit boards 112C and 90C, and connector 120C extending therebetween.

The present teachings thus advantageously provide for tilt and turn dial assemblies 10 (including dial assemblies 10A, 10B, and 10C for example), which a user can tilt in various directions, such as in tilt directions T1, T2, T3, or T4, in order to input various commands to the HMI 12 corresponding to the tilt position. After the user tilts the dial assemblies 10 to the desired tilt position, the dial assemblies 10 lock at the selected tilt position without reverting to the neutral position of FIG. 1. The user can then input additional commands by rotating the outer dial 62A, 62B, 62C. The dial assemblies 10 advantageously allow a user to input a variety of different commands based on tilt position of the base dial 60A, 60B, 60C, as well as rotation of the outer dials 62A, 62B, 62C. The user can input yet additional commands by pushing the push button 64A, or any other suitable push button. Thus the dial assemblies 10 reduce the number of switches and dials necessary to operate a plurality of different functions through the HMI 12, and free up additional space at a vehicle center console for other uses.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A control dial for inputting commands to a human-machine interface (HMI), the control dial comprising:
   a base dial mounted to a support post of a base configured to support the base dial at a neutral position, a plurality of first tilted positions tilted in a first direction from the neutral position, and a plurality of second tilted positions tilted in a second direction from the neutral position, the second direction is opposite to the first direction, the support post is mounted to the base, and both the support post and the base are stationary;
   a plurality of locking members mounted to the base on opposite sides of the support post, the plurality of locking members cooperate with recesses of the base dial to lock the base dial at each one of the plurality of first tilted positions and the plurality of second tilted positions; and
   an outer dial rotatably mounted to the base dial such that the outer dial is rotatable to enter commands to the HMI at each one of the neutral position, the plurality of first tilted positions, and the plurality of second tilted positions.

2. The control dial of claim 1, wherein the base is further configured to support the base dial at a third tilted position tilted in a third direction from the neutral position, and a fourth tilted position tilted in a fourth direction from the neutral position, the fourth direction is opposite to the third direction, and the third and fourth directions are 90° relative to the first and second directions; and
   wherein the outer dial is rotatable to enter commands to the HMI at each one of the third tilted position and the fourth tilted position.

3. The control dial of claim 1, further comprising a push button seated within the outer dial, pushing the push button at any one of the neutral position, the plurality of first tilted positions, and the plurality of second tilted positions enters a command to the HMI.

4. The control dial of claim 2, further comprising a push button seated within the outer dial, pushing the push button at any one of the neutral position, the plurality of first tilted positions, the plurality of second tilted positions, the third tilted position, and the fourth tilted position enters a command to the HMI.

5. The control dial of claim 2, wherein the base is configured to lock the base dial at each one of the plurality of first tilted positions, the plurality of second tilted positions, the third tilted position, and the fourth tilted position.

6. The control dial of claim 1, further comprising a plurality of sensors mounted to a primary printed circuit board arranged at the base, tilting the base dial in the first direction actuates a first one of the plurality of sensors, which generates a first signal indicating that the base dial has been tilted in the first direction, and tilting the base dial in the second direction actuates a second one of the plurality of sensors, which generates a second signal indicating that the base dial has been tilted in the second direction.

7. The control dial of claim 6, wherein the plurality of sensors include one or more of the following: a switch; a tact switch; a 2-way switch an optical sensor; a Hall effect sensor; or a potentiometer.

8. The control dial of claim 1, further comprising a rotary sensor configured to identify how far the outer dial has been rotated.

9. The control dial of claim 8, wherein the rotary sensor includes: a shaft encoder; a potentiometer; a switch; a 2-way switch; a tact switch; an optical sensor; a Hall effect sensor; or a potentiometer.

10. The control dial of claim 8, wherein the rotary encoder is mounted to a satellite printed circuit board that is spaced apart from a primary printed circuit board that a plurality of switches are mounted to for identifying whether the base dial is in the neutral position, the first tilted position, or the second tilted position.

11. The control dial of claim 3, further comprising a push button switch configured to generate a push button signal when the push button is depressed.

12. The control dial of claim 11, wherein the push button switch is mounted to a satellite printed circuit board that is spaced apart from a primary printed circuit board that a plurality of switches are mounted to for identifying whether the base dial is in the neutral position, the plurality of first tilted positions, or the plurality of second tilted positions; and
    wherein the satellite printed circuit board is connected to the primary printed circuit board.

13. The control dial of claim 12, wherein the satellite printed circuit board is fixed to the base dial.

14. The control dial of claim 13, further comprising at least one LED mounted to the satellite printed circuit board for at least one of back lighting of the push button and illumination of a glow ring surrounding the outer dial.

15. The control dial of claim 1, wherein at the plurality of first tilted positions the base dial is angled about 10°-20° relative to the neutral position; and
    wherein at the plurality of second tilted positions the base dial is angled about 10°-20° relative to the neutral position.

16. A control dial for inputting commands to a human-machine interface (HMI), the control dial comprising:
    a base dial mounted to a base configured to support the base dial at a neutral position, a first tilted position tilted in a first direction from the neutral position, and a second tilted position tilted in a second direction from the neutral position, the second direction is opposite to the first direction;
    an outer dial rotatably mounted to the base dial such that the outer dial is rotatable to enter commands to the HMI at each one of the neutral position, the first tilted position, and the second tilted position;
    a first sensor configured to identify whether the base dial is in the neutral position, the first tilted position, or the second tilted position;
    a second sensor configured to identify a distance that the outer dial has been rotated; and
    a circuit board in receipt of signals from the first sensor and the second sensor, the circuit board configured to relay the signals to a control module;
    wherein the base dial is mounted to the base with a ball joint, a ball of the ball joint is mounted to an end of a post extending through a receptacle of the ball joint to arrange the ball on a side of the base opposite to the base dial, the receptacle defines a plurality of locking regions each configured to receive the ball and retain the base dial in any one of the neutral position, the first tilted position, and the second tilted position.

17. The control dial of claim 1, further comprising a device that produces haptic feedback that engages an inner surface of the outer dial to define a plurality of rotational click positions of the outer dial.

18. The control dial of claim 16, wherein the ball joint retains the base dial at any one of the plurality of first tilted positions, the plurality of second tilted positions, a third tilted position, and a fourth tilted position;
    wherein the third tilted position is opposite to the fourth tilted position.

\* \* \* \* \*